(12) United States Patent
Davis et al.

(10) Patent No.: US 9,697,342 B2
(45) Date of Patent: Jul. 4, 2017

(54) BIOMETRIC AUTHENTICATION STRIPE

(71) Applicant: Lenovo (Singapore) Pte. Ltd., Singapore (SG)

(72) Inventors: Mark Charles Davis, Durham, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 177 days.

(21) Appl. No.: 14/172,313

(22) Filed: Feb. 4, 2014

(65) Prior Publication Data
US 2015/0220770 A1    Aug. 6, 2015

(51) Int. Cl.
| | |
|---|---|
| *G06F 21/32* | (2013.01) |
| *G06K 19/06* | (2006.01) |
| *G06Q 20/34* | (2012.01) |
| *G06F 3/0488* | (2013.01) |
| *G06K 19/07* | (2006.01) |
| *G07C 9/00* | (2006.01) |

(52) U.S. Cl.
CPC ............ *G06F 21/32* (2013.01); *G06F 3/0488* (2013.01); *G06K 19/06206* (2013.01); *G06K 19/0718* (2013.01); *G06Q 20/341* (2013.01); *G07C 9/00087* (2013.01); *G07C 2009/00095* (2013.01)

(58) Field of Classification Search
CPC .......... G06K 9/00087; G06K 19/06206; G06F 21/32; G06F 3/0488; G06Q 20/34; G06Q 30/341
See application file for complete search history.

(56) References Cited

U.S. PATENT DOCUMENTS

| | | | |
|---|---|---|---|
| 5,457,747 A | 10/1995 | Drexler et al. | |
| 6,848,617 B1 | 2/2005 | Fries et al. | |
| 2003/0226041 A1 | 12/2003 | Palmer et al. | |
| 2005/0240778 A1* | 10/2005 | Saito ............... | G06K 19/07354 713/186 |
| 2006/0218097 A1 | 9/2006 | Walker et al. | |
| 2007/0073619 A1 | 3/2007 | Smith | |
| 2007/0289000 A1* | 12/2007 | Weiss .................... | G06F 21/32 726/5 |
| 2008/0028230 A1 | 1/2008 | Shatford | |

(Continued)

FOREIGN PATENT DOCUMENTS

| | | |
|---|---|---|
| EP | 2175344 A2 | 4/2010 |
| EP | 2360560 A1 | 8/2011 |

(Continued)

OTHER PUBLICATIONS

Combined Search and Examination Report GB1421405.0 of May 28, 2015 (8 pages).

(Continued)

*Primary Examiner* — Dao Ho
(74) *Attorney, Agent, or Firm* — Brian J. Pangrle

(57) ABSTRACT

A device can include memory that stores information; a sensor that senses information; authentication circuitry that authenticates sensed information; and a field generator that outputs at least one magnetic field based at least in part on a portion of stored information responsive to authentication of sensed information. Various other apparatuses, systems, methods, etc., are also disclosed.

15 Claims, 13 Drawing Sheets

(56) References Cited

U.S. PATENT DOCUMENTS

| | | |
|---|---|---|
| 2008/0029608 A1 | 2/2008 | Kellum et al. |
| 2011/0102141 A1 | 5/2011 | Wu |
| 2013/0036463 A1* | 2/2013 | Shashidhar ........ G06K 19/0718 |
| | | 726/20 |
| 2013/0056539 A1 | 3/2013 | Iwaloye |
| 2013/0194176 A1 | 8/2013 | Chung |
| 2013/0207786 A1 | 8/2013 | Hutzler et al. |
| 2014/0074696 A1* | 3/2014 | Glaser ................. G06Q 20/341 |
| | | 705/39 |

FOREIGN PATENT DOCUMENTS

| | | |
|---|---|---|
| EP | 2680099 A2 | 1/2014 |
| EP | 2720129 A1 | 4/2014 |
| EP | 2725472 A2 | 4/2014 |
| EP | 2816442 A1 | 12/2014 |
| WO | 2009055303 A1 | 4/2009 |
| WO | 2013163233 A1 | 10/2013 |
| WO | 2013186682 A1 | 12/2013 |

OTHER PUBLICATIONS

Sharrock, Time dependence of switching fields in magnetic recording media, J. Appl. Phys. 76 (10), Nov. 15, 1994 (6 pages).
Miaxis Biometrics Co., Ltd. SM-621 Fingerprint Verification Module User Manual (V1.0), Jan. 24, 2007 (36 pages).
Matsumoto et al., Thermally Assisted Magnetic Recording, Fujitsu Sci. Tech. J., 32, 1, p. 158-167, Jan. 2006 (10 pages).
MAKStripe Parallel Port (http://www.makinterface.de/makstripee.php3) 2005(?) (19 pages).
Brush Industries, SideWinder, 2010 (2 pages).
Silicon Labs, Magnetic Stripe Reader (AN148) Rev. 1.3 Aug. 2008 (2008) (82 pages).
JP Morgan, Single-Use Accounts AP, 2011 (2 pages).
JP Morgan, ServiceMaster, 2009 (2 pages).

* cited by examiner

BIOMETRIC AUTHENTICATION STRIPE

CROSS-REFERENCE TO RELATED APPLICATIONS

This application is related to commonly assigned U.S. patent application Ser. No. 14/172,343, entitled BIOMETRIC AUTHENTICATION DISPLAY, which has been filed on 4 Feb. 2014 and which is incorporated by reference herein in its entirety and this application is related to commonly assigned U.S. patent application Ser. No. 14/172,416, entitled BIOMETRIC ACCOUNT CARD, which has been filed on 4 Feb. 2014 and which is incorporated by reference herein in its entirety.

TECHNICAL FIELD

Subject matter disclosed herein generally relates to information storage devices technologies.

BACKGROUND

An information storage device such as, for example, a credit card may include a stripe that includes magnetic material that has been encoded with one or more tracks of information. As an example, such a card may be read by a reader for purposes of a financial transaction. As the information stored in the stripe is persistent, generally for years, a lost or stolen card may be used illicitly. Various technologies and techniques described herein pertain to information storage devices such as, for example, credit cards.

SUMMARY

A device can include memory that stores information; a sensor that senses information; authentication circuitry that authenticates sensed information; and a field generator that outputs at least one magnetic field based at least in part on a portion of stored information responsive to authentication of sensed information. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

As mentioned, an information storage device such as, for example, a credit card may include a strip or stripe that includes magnetic material that has been encoded with one or more tracks of information. If such a credit card is stolen, it may be used for illicit transactions, which may cause losses to a credit card company, insurance company, merchant, end user, etc. To help mitigate risks, a credit card or a debit card may have an associated PIN (e.g., personal identification number). However, a PIN may be guessed, observed, etc. And, use of a PIN may be inconvenient and require particular point of sale (POS) hardware, circuitry, etc.

Figure 1:
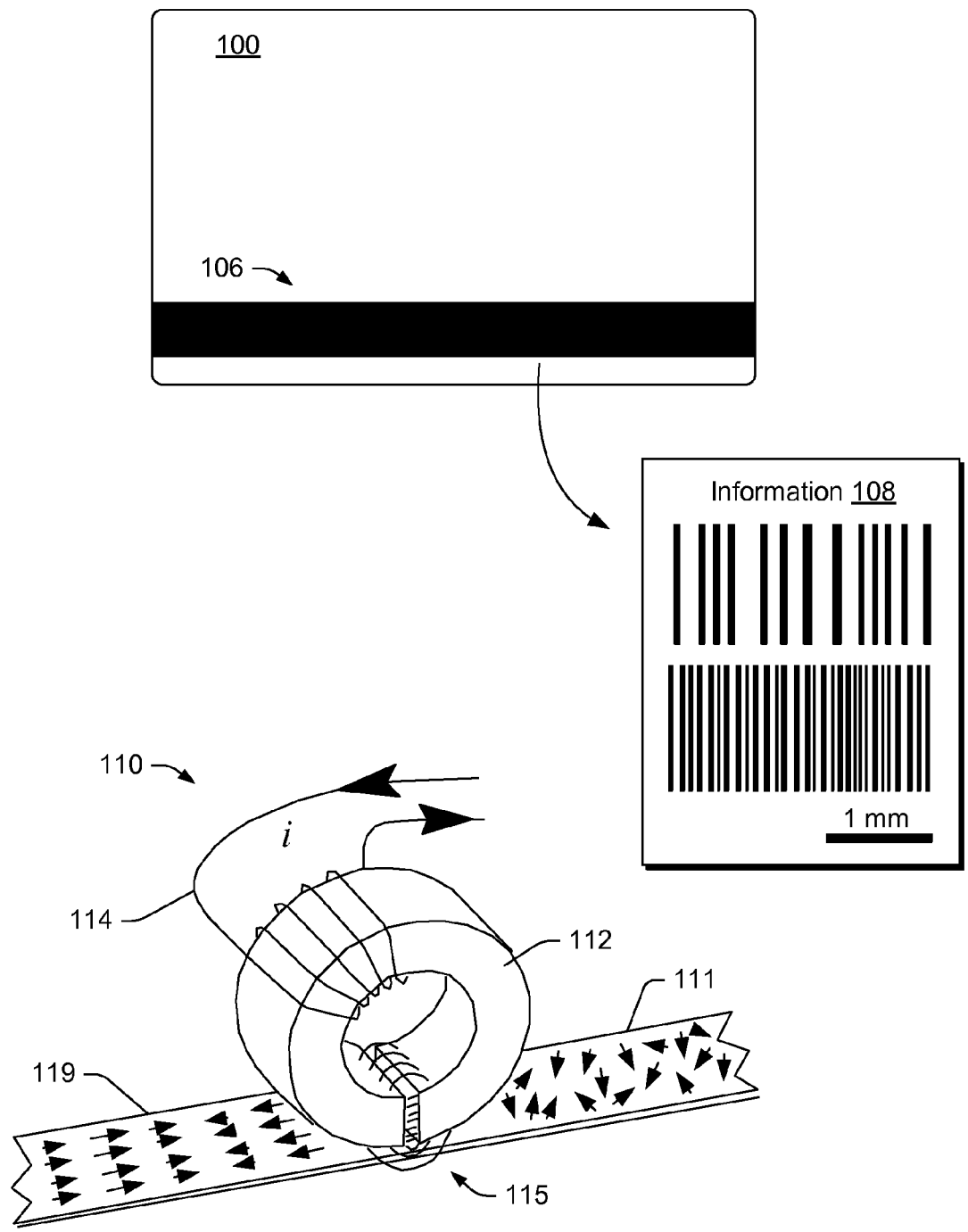
FIG. 1 is a diagram of examples of a card, information stored thereon and a field generator.

FIG. 1 shows an example of a card 100 that includes magnetic material 106 for storing information 108 (e.g., the card 100 may be referred to as an information storage device). The magnetic material 106 may be characterized in part by a property known as coercivity, which may be in units such as oersteds (Oe). In CGS, the unit of H-field is the oersted (Oe) and the unit of B-field is the gauss (G). In the SI system, ampere per meter (Nm) is used for H-field and tesla (T) is used for B-field. As to CGS to SI conversion, an oersted (Oe) is about 80 ampere per meter (Nm). As units of oersteds (Oe) may be used to characterize, specify, etc. magnetizing field strength, they are related to magnetomotive force (mmf) of current, for example, consider mmf of current in a single-winding wire-loop.

As an example, an H-field may be viewed akin to an electric field E, which starts at a positive electric charge and ends at a negative electric charge. For example, near a north pole lines of an H-field point outwardly while near a south pole lines of an H-field point inwardly (e.g., toward the south pole). A north pole (N) may experience force in a direction of an H-field while force experienced by a south pole (S) may be in a direction opposite to the H-field. In a magnetic pole model, the elementary magnetic dipole (m) may be formed by two opposite magnetic poles of pole strength ($q_m$) separated by a distance vector (d), for example, such that $m=q_m d$.

In the example of FIG. 1, coercivity may define one or more magnetic field properties for encoding, erasing, etc. information in the magnetic material 106. As an example, a low coercivity material may be rated at about 300 Oe while high coercivity material may be rated at about 1,250 Oe or more. As an example, a bank card such as, for example, a credit card or debit card, may include magnetic material rated at about 2,750 Oe. As an example, a card may be provided with a magnetic material such as iron oxide, barium ferrite or other magnetic material.

As an example, a slurry may be formed that is loaded with an amount of magnetic material and, for example, an amount of binder. Such a slurry may be coated onto a substrate such as a card.

FIG. 1 also shows an assembly 110 that includes a core 112 and a coil 114 for encoding information onto magnetic material 111 to produce encoded magnetic material 119. As shown, the core 112 includes a gap such that current carried by the coil 114 causes the core 112 to generate a magnetic field 115. The generated magnetic field 115 can cause magnetic material 111 to align in a manner that represents information to produce encoded magnetic material 119.

As an example, a core may be made of a metallic material upon which turns of wire are wound to form a magnetic read and/or write head. As shown in FIG. 1, the core 112 has a "C" shape. The gap of the core 112, across which magnetic lines of flux exist, may include a gap distance, for example, in a range of about 12 microns to about 50 microns. As an example, a gap may include a gap width (e.g., orthogonal to a gap distance). For example, a gap width may determine width of an encoded track on a magnetic stripe. As an example, a gap width may be specified according to one or more ISO standards. For example, a gap width may be in a range from about 2.5 mm to about 3.2 mm or more.

As an example, the coil 114 may carry current of the order of about 1 mA to about 2500 mA or more such that the core 112 acts as a magnetic head that can encode information in the magnetic material 111. As an example, a write head may employ write currents in a range from about 5 mA to about 100 mA peak-to-peak for a low coercivity magnetic material and, for example, about 100 mA to about 2500 mA peak-to-peak for a high coercivity material. As an example, a write current may depend on a number of turns in a winding (e.g., inductance), core material, etc.

As an example, a method may include encoding information in magnetic material, for example, as in magnetic material that is bound to or otherwise carried by a substrate such as a card (e.g., a card made of plastic and/or other material). As an example, a magnetic recording head may be used to encode or write information in magnetic material, which may be provided as a stripe. For example, alternating current may be carried by a coil about a core such that the core acts as a head that produces alternating zones of north-south and south-north magnetization. Such zones may represent bits of information. In the example of FIG. 1, the information 108 is illustrated as tracks of information stored in magnetic material (e.g., a magnetic medium).

As an example, a card may include one or more tracks of information, for example, that may conform to one or more standards (e.g., consider ISO standards). As an example, a track may include an end sentinel, for example, a character encoded on a magnetic stripe just after particular information (e.g., account information, etc.,) and just before a longitudinal redundancy check (LRC) character. As an example, an ISO standard may specify tracks where, for example, for tracks 2 and 3, the end sentinel is 11111 and where, for example, for track 1, the end sentinel is 111110. Such information may be direction, for example, from left to right.

A characteristic known as remanance may define the extent to which magnetic material remains magnetized after removal of a saturating magnetic field. As an example, remaining magnetic field encoded in magnetic material may be referred to as residual magnetization. As an example, a higher remanance may yield a higher amplitude encoded signal than a lower remanance. As an example, factors such as remanance, loading and thickness of magnetic material (e.g., as a layer) may determine signal amplitude of residual magnetization.

As an example, information may be encoded and defined in part by resolution. Resolution may be defined as a measure of signal amplitude of magnetic material at a higher density versus signal amplitude at a lower density. As an example, resolution may be determined by dividing amplitude at a high density by amplitude at a lower density, for example, to yield a resolution factor from about 0 to about 1.

As an example, an inflection point may be defined as a spot near an x-axis on a magnetic signal waveform where a curve changes direction. Inflection points may be present for digital information (e.g., binary 1s and 0s) at about 3 bits per mm to about 8 bits per mm (e.g., or more). More pronounced evidence of inflection points may be an indicator of higher resolution. As an example, a magnetic stripe of a card may be characterized in part by a spatial bit density that is a linear density that may correspond to an inflection point density. For example, a magnetic stripe of a card may be characterized by a spatial bit density in a range from about 3 bits per mm (e.g., about 30 bits per cm) to about 8 bits per mm (e.g., about 80 bits per cm). As an example, the spatial bit density may differ over the length of a magnetic stripe. As an example, bits may be encoded to represent characters (e.g., alphanumeric characters, numeric characters, etc.). As an example, a character may be specified according to a bit-depth (e.g., 7-bit alphanumeric characters, 5-bit numeric characters, etc.).

As mentioned, a card may include one or more tracks of information. As an example, a reader may be configured to read a track or tracks. As an example, a track may be a standardized track. For example, an International Air Transportation Association (IATA) track is specified to be encoded at 210 bits per inch with a maximum data length of 79 characters (e.g., for encoding an 18 digit primary account number and up to 26 alphanumeric characters that may include a person's name). As another example, consider an American Bankers Association (ABA) track (e.g., for financial transactions), which may be specified to be encoded at 75 bits per inch with a maximum data length of 40 numeric characters (e.g., for encoding a 19 digit account number). As yet another example, consider a track that may be used by financial institutions to store an encrypted PIN code, country code, currency units, amount authorized, subsidiary account information, and other account restrictions. Such a track may be, for example, encoded at 210 bits per inch with a maximum data length of 107 numeric digits.

As mentioned, a card may include one or more tracks of information. As an example, a reader may be configured to read a track or tracks. For example, a reader may include a read head configured to read a track or tracks as a card is swiped past the read head (e.g., translated with respect to a read window or read windows of the read head). As to data rates, as an example, for a range of spatial bit densities from about 30 bits per cm to about 80 bits per cm and a range of "swipe speeds" from about 20 cm per second to about 50 cm per second, data rates may be in a range from about 600 bits per second to about 4000 bits per second.

Where information is encoded on a substrate such as a card and where the card is lost, stolen, "borrowed", etc., the information may be used illicitly (e.g., without authorization). For example, a lost credit card may be run through a reader to allow one to determine what information exists on the card (e.g., accounts, etc.). As another example, where a card is temporarily given to another, that person may swipe the card through a reader for a legitimate purpose and also swipe the card through a reader for an illegitimate purpose. For example, the person may have a reader for the purpose of stealing information.

As mentioned, a bank card may have a stripe with high coercivity magnetic material, for example, rated at about 2,750 Oe. High coercivity may be beneficial to a card holder as the magnetic flux carried by the magnetic material may persist for years and be relatively stable even when exposed to stray fields (e.g., from household electronics, vehicles, etc.). Such a card may be considered to be persistent or in an always "on" state. In other words, bits of information may be persistently present as magnetic field inflection points encoded in magnetic material of a stripe of such a card.

Figure 2:
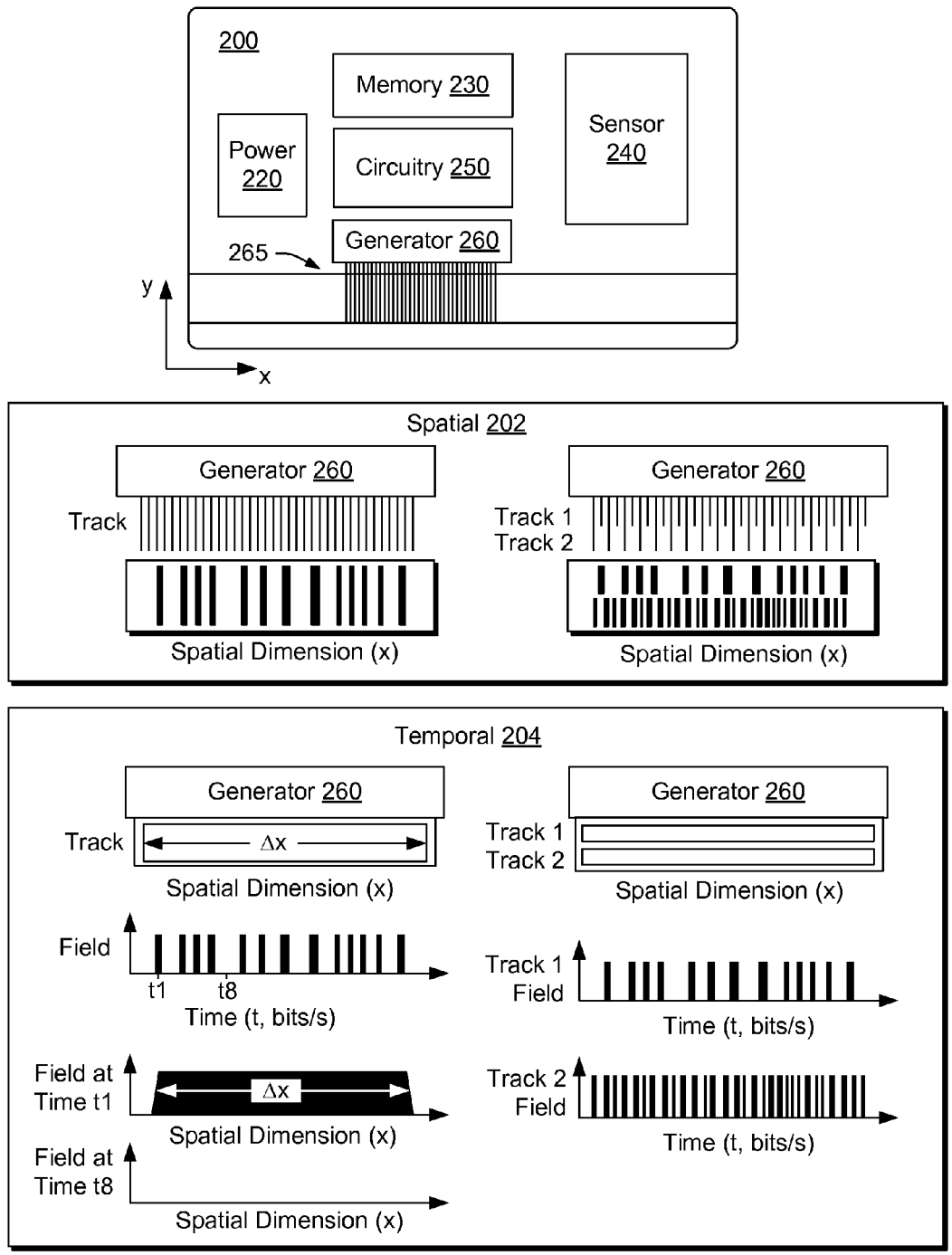
FIG. 2 is a diagram of an example of a card.

FIG. 2 shows an example of a device 200 that includes a power source 220, memory 230, a sensor 240, circuitry 250 and a generator 260 that may generate a field, for example, with respect to a field window or emissions window 265. As an example, the emissions window 265 may be defined with respect to a coordinate system such as, for example, a Cartesian coordinate system (see, e.g., x and y coordinates in FIG. 2).

In the example of FIG. 2, the device 200 includes the memory 230 that can store information; the sensor 240 that can sense information; the circuitry 250 that can authenticate sensed information (e.g., authentication circuitry); and the generator 260 that can output at least one magnetic field, for example, based at least in part on a portion of stored information responsive to authentication of sensed information.

FIG. 2 also shows some examples of spatial schemes 202 and temporal schemes 204 for outputting at least one magnetic field. For example, the generator 260 may be configured to output one or more tracks of spatial magnetic fields. As shown with respect to the spatial schemes 202, a spatial magnetic field may be defined with respect to one or more coordinates such as, for example, an x-coordinate; noting that in FIG. 2, the illustrated features are approximate as resolution may be finer (see, e.g., the information 108 of FIG. 1). As an example, a spatial magnetic field may vary in field strength with respect to a spatial coordinate. In such an example, the spatial magnetic field may form inflection points that may define bits of information. As an example, the circuitry 250 of the device 200 may instruct the generator 260 as to information to be output.

As to output of at least one or more tracks of temporal magnetic fields, as shown with respect to the temporal schemes 204, the generator 260 may be configured to output one or more tracks of temporal magnetic fields, for example, via one or more emission windows, which may be spatially located. For example, an emission window may span a distance Δx and provide output as to one or more tracks of information. As shown in FIG. 2, a temporal scheme may output fields with respect to time (t) to effectively output bits of information with respect to time (t). For example, FIG. 2 shows an approximate plot of field strength versus time (t), which includes times t1 and t8. As shown, at time t1, the field output by the generator 260 may be at an elevated value and relatively uniform across the emissions window that spans the distance Δx; whereas, at time t8, the generator 260 may output no field or, for example, a diminished field (e.g., at a diminished value) across the emissions window that spans the distance Δx. In such an example, the generator 260 may generate field inflection points with respect to time where the field inflection points encode information (e.g., bits of information) that may be, for example, read by a reader.

FIG. 2 also shows a temporal scheme for multiple tracks (Track 1 and Track 2) where, for example, the generator 260 may generate fields for Track 1 and may generate fields for Track 2. In such an example, the fields for each of the multiple tracks may differ. As an example, the generator 260 may optionally be configured for output of one or more tracks where, for example, multiple tracks may optionally be output simultaneously (e.g., to be read via a single swipe with respect to a reader).

As shown with respect to the temporal schemes 204, a temporal magnetic field may be defined with respect to a temporal coordinate, time (t). As an example, a temporal magnetic field may vary in field strength with respect to time (t).

As to the sensor 240 of the device 200 of FIG. 2, it may be a biometric sensor such as, for example, a fingerprint sensor. As an example, the sensor 240 may include one or more types of circuitry. For example, the sensor 240 may be configured as a capacitance sensor, which may sense passive and/or active capacitance.

As an example, a passive capacitance sensor may include an array of elements that may act individually as one plate of a parallel-plate capacitor. As to a fingerprint sensor, a dermal layer (e.g., an electrically conductive layer) may act as an opposing plate and a substantially non-conductive epidermal layer may acts as dielectric layer. In such a sensor, the elements may sense differences in the dielectric layer (e.g., via capacitance) where such differences depend on characteristics of a fingerprint (e.g., a finger or a thumb). For example, capacitance may vary between ridges and valleys of a fingerprint due to the fact that the volume between a dermal layer and a sensing element in valleys includes an air gap. As an example, the dielectric constant of an epidermis and area of a sensing element may be known and measured capacitance values may be used to distinguish between fingerprint ridges and valleys.

As an example, an active capacitance sensor may measure ridge patterns of a dermal layer. For example, an active capacitance sensor may use a charging cycle to apply a voltage to skin before measurement takes place. In such an example, the application of voltage may act to charge the effective capacitor. On a discharge cycle, the voltage across a dermal layer and a sensing element may be compared to a reference voltage for purposes of calculating capacitance. In such an example, distance values may be calculated and used to form an image of a fingerprint. An active capacitance sensor may be more immune to cleanliness of a sensing surface (e.g., a sensor window) and cleanliness of skin.

In the example of FIG. 2, the circuitry 250 may receive signals from the sensor 240 and analyze the signals with respect to stored information, for example, as stored in the memory 230. As an example, an analysis may include processing the signals to determine characteristics such as fingerprint characteristics and comparing at least a portion of the determined characteristics to at least a portion of stored fingerprint characteristics, for example, to decide whether a match exists between a sensed fingerprint and a known fingerprint. Such an approach may act to authenticate biometric information sensed via the sensor 240. Responsive to authentication of biometric information, the circuitry 250 may cause, for example, the generator 260 to generate at least one magnetic field. For example, the circuitry 250 may control the generator 260 to generate at least one magnetic field based on information associated with an identity that has been authenticated via sensing biometric information via the sensor 240. As an example, information associated with an identity may be or include account information, security information, control information, etc.

As an example, a card may include memory that stores account information and biometric information; a sensor that senses biometric information; authentication circuitry that authenticates sensed biometric information at least in part via a comparison to stored biometric information; and a field generator that outputs at least one magnetic field based at least in part on a portion of the stored account information responsive to authentication of sensed biometric information.

As an example, the generator 260 may output at least one magnetic field based at least in part on a portion of stored information responsive to authentication of sensed information. In such an example, the generator 260 may output at least one magnetic field for a period of time. For example, the generator 260 in the example of FIG. 2 may output at least one magnetic field for a period of time of the order of tens of seconds. As an example, a generator may output at least one magnetic field for a period of time in a range from about 10 seconds to about 120 seconds. As an example, where a generator may output at least one magnetic field to a medium (e.g., a medium that include magnetic material), a period of time may be sufficient to write information to the medium. In such an example, a period of time may be less than about 10 seconds and may be, for example, less than about 1 second.

As an example, an energy conservation algorithm may be implemented by a generator that outputs at least one magnetic field. For example, a generator may output pulses, for example, at a pulse frequency. As an example, a pulse frequency may be selected based in part on one or more characteristics of a reader (e.g., a read head and/or associated circuitry).

As an example, a generator may output at least one magnetic field based at least in part on a portion of stored information responsive to authentication of sensed information with a delay, further in response to a trigger, etc. For example, where the device 200 is a card for performing a financial transaction, in response to authentication of sensed information, a generator may delay generation of output for a period of time of the order of seconds, which may correspond to a delay between possession of the card by an authorized (e.g., authenticated) card holder and positioning of the card with respect to a reader (e.g., a card reader).

As to a trigger, the device 200 may include circuitry, optionally operatively coupled to the sensor 240, which can detect presence of a reader. For example, a reader may include a slot and a card may include a sensor that can determine when the card is positioned in the slot. In such an example, responsive to authentication of sensed information, sensor circuitry may be activated that may, in response to detection of the card being positioned in the slot of the reader, cause a generator to generate at least one magnetic field to be read by the reader (e.g., one or more read heads of the reader).

As an example, a trigger may cause a generator to generate at least one magnetic field for a period of time, which may be a period of time sufficient for a reader to read the at least one magnetic field (e.g., a period of time of the order of seconds). As an example, the trigger may be programmed to allow for a predetermined number of swipes (e.g., attempts). For example, if the card detects a slot more than three times (e.g., three swipes or attempts), it may reset the card with respect to authentication of sensed information such that re-authentication is required before the generator will generate at least one magnetic field (e.g., that represents information such as account information, etc.).

As an example, various techniques, technologies, etc. may act to conserve energy of a power source and/or may act to enhance security of a card such as the device 200.

As an example, information output via an emissions window (e.g., of a device such as the device 200 of FIG. 2, etc.) may pertain to a single-use account (SUA), a controlled-use account, controlled use accounts, digital currency or other type of information. As an example of digital currency, consider a cryptocurrency such as the Bitcoin currency. As an example, a cryptocurrency unit such as, for example, a bitcoin unit (BTC) may be a single-use account as, according to various standards, ownership may be transferred once (e.g., for a payor/payee transaction). As an example, while a BTC is mentioned, multiples of a BTC and fractions of a BTC may be considered a "unit" of digital currency (e.g., a bitcointon, a santoshi, etc.) the ownership of which may be transferred as a single-use account.

Figure 3:
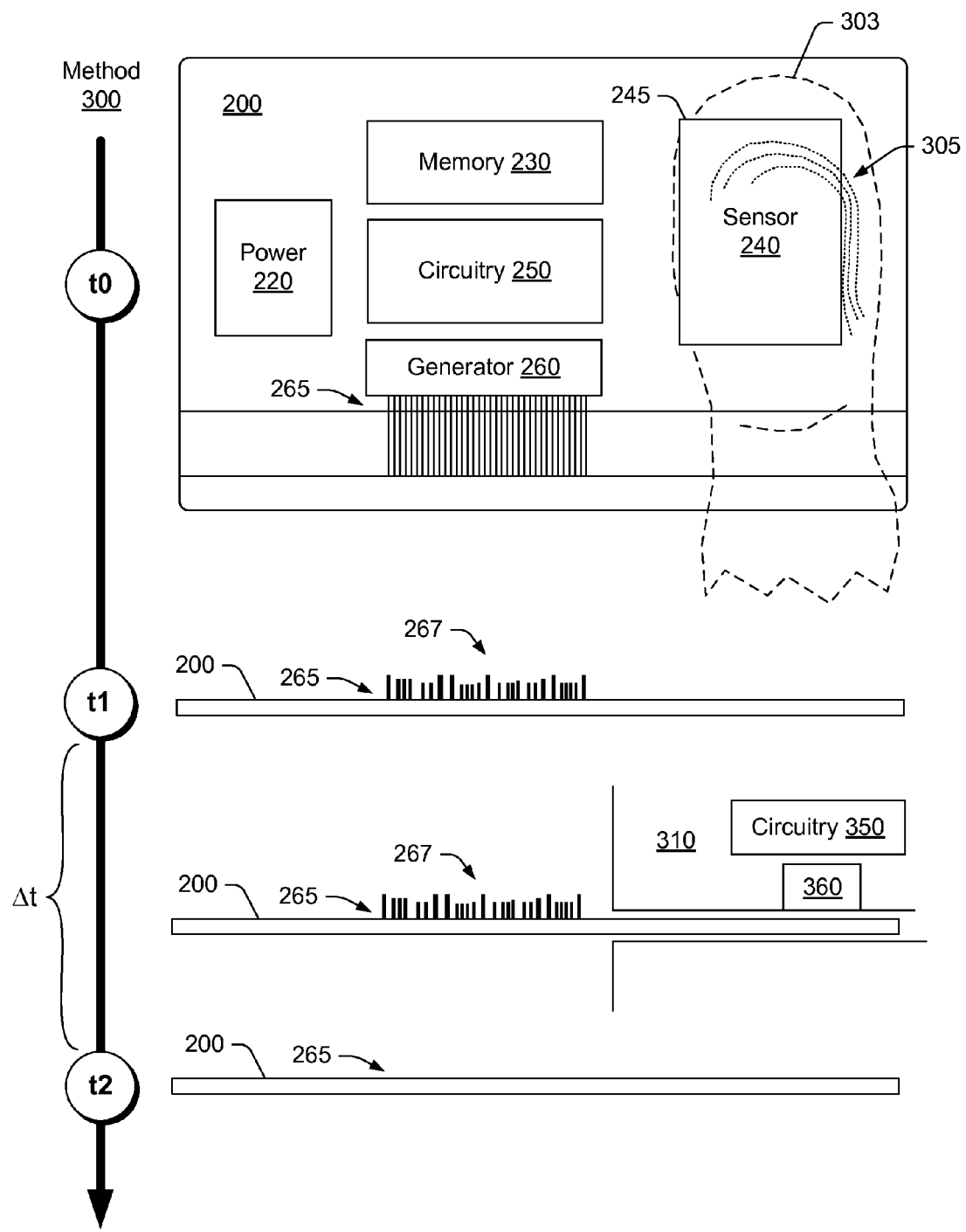
FIG. 3 is a diagram of an example of a method.

FIG. 3 shows an example of a method 300 with respect to a time line where the method 300 may include using the device 200 and, for example, a reader 310 (e.g., a POS device, etc.) that includes circuitry 350 operatively coupled to a read head 360 (e.g., or read heads).

As shown in the example of FIG. 3, at a time t0, a finger 303 with a fingerprint 305 is positioned with respect to a sensor window 245 associated with the sensor 240 of the device 200. At a time t1, the generator 260 generates at the emissions window 265 at least one magnetic field 267. At a time less than t2 and greater than t1, denoted Δt, the device 200 is passed via a slot of the reader 310. At time t2, the at least one magnetic field 267 is no longer present at the emissions window 265 (e.g., no longer present in a manner capable of being read by the read head 360). In the example of FIG. 3, the at least one magnetic field 267 may include magnetic fields spatially arranged to effectively create inflection points. In such an example, the magnitude of fields generated may be relatively even, differ, etc.

As an example, the device 200 may be configured to emit at least one magnetic field in a temporal manner, for example, as explained with respect to the temporal schemes 204 of FIG. 2. In such an example, upon authentication of sensed information, the generator 260 may generate a temporal field that may optionally loop in time (e.g., repeated loops for a period of time). As mentioned, information encoded may include one or more codes that may indicate a start and/or an end of a "string" of information. In such an example, the circuitry 350 of the reader 310 may be able to decode a generated temporal field, which may be, for example, "played" in a loop. As an example, a session may be a single loop play or, for example, a string of loops played within a period of time (e.g., responsive to authentication, etc.).

As an example, a temporal field such as one of the temporal fields of the temporal schemes 204 of FIG. 2 may allow for placing a card in a reader without translating the card in the reader as the temporal aspect of the field may mimic a bit rate achieved via swiping. For example, a generator may output a temporal field that varies in strength (e.g., to create inflection points) at a rate that matches a rate (e.g., within an operable range of rates) of a read head or read heads (e.g., of a reader, etc.). As mentioned, a reader for a magnetic stripe card may be configured to operate within a range of data rates, for example, consider a range from about 600 bits per second to about 4000 bits per second.

As an example, a method may include emitting magnetic fields via a stationary emissions window of an apparatus at a data rate that matches a data rate of magnetic field read circuitry (e.g., a read head). In such an example, the magnetic fields may include magnetic field inflection points that occur with respect to time that represent bits of information. In such an example, the magnetic field read circuitry may decode the bits of information as emitted via the stationary emissions window.

Figure 4:
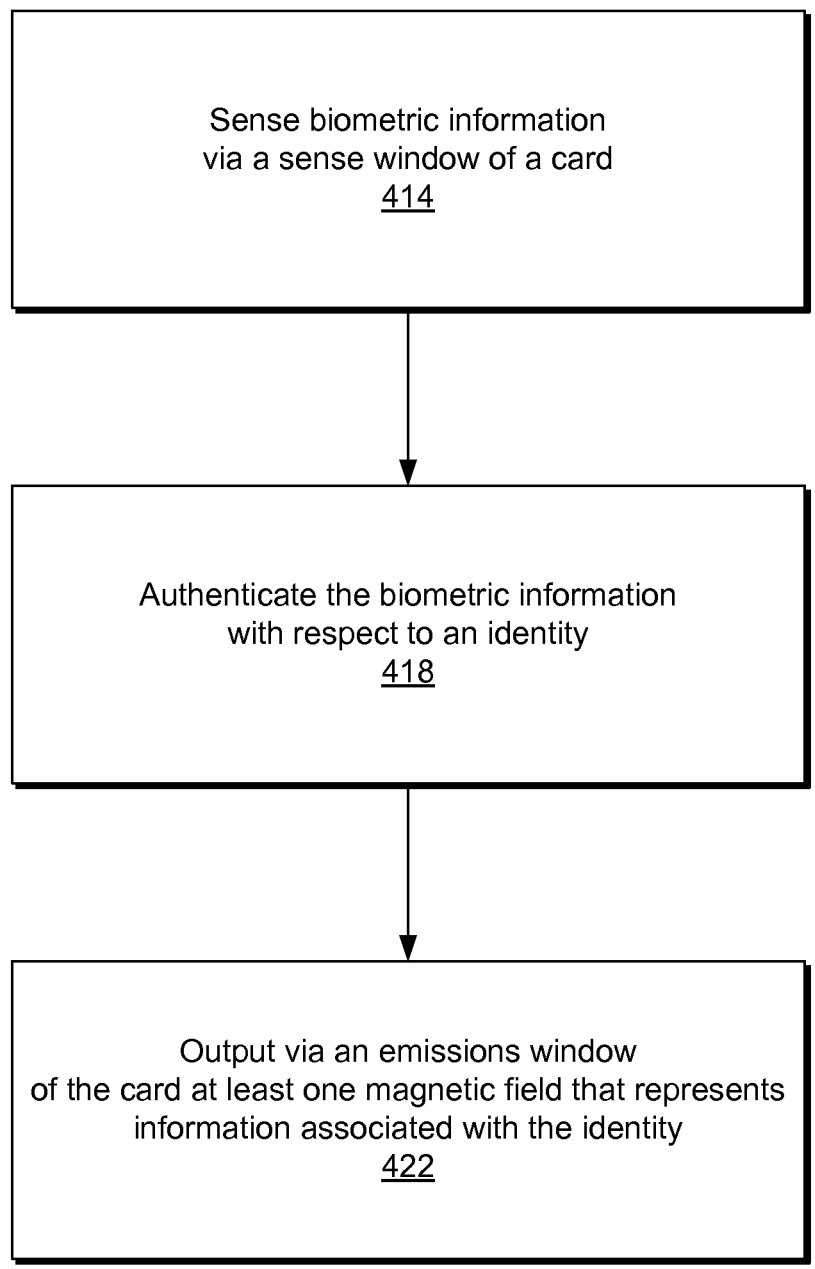
FIG. 4 is a diagram of an example of a method.

FIG. 4 shows an example of a method 410 that includes a sense block 414 for sensing biometric information via a sense window of a card, an authentication block 418 for authenticating the biometric information with respect to an identity, and an output block 422 for outputting via an emissions window of the card at least one magnetic field that represents information associated with the identity.

As an example, a method may include sensing biometric information via a sense window of a card; authenticating the biometric information with respect to an identity; and responsive to the authenticating, outputting via an emissions window of the card at least one magnetic field that represents information associated with the identity. In such an example, the information associated with the identity may include account information. As an example, a method may include passing a card through a magnetic stripe reader such as, for example, a POS device, a security device, etc. For example, a card may be an identity card that permits an individual to access a building, a room, a vehicle, etc. As an example, a card may be an identity card that permits an individual to log into a system. For example, a system may be a computer system, an attendance system, etc.

Figure 5:
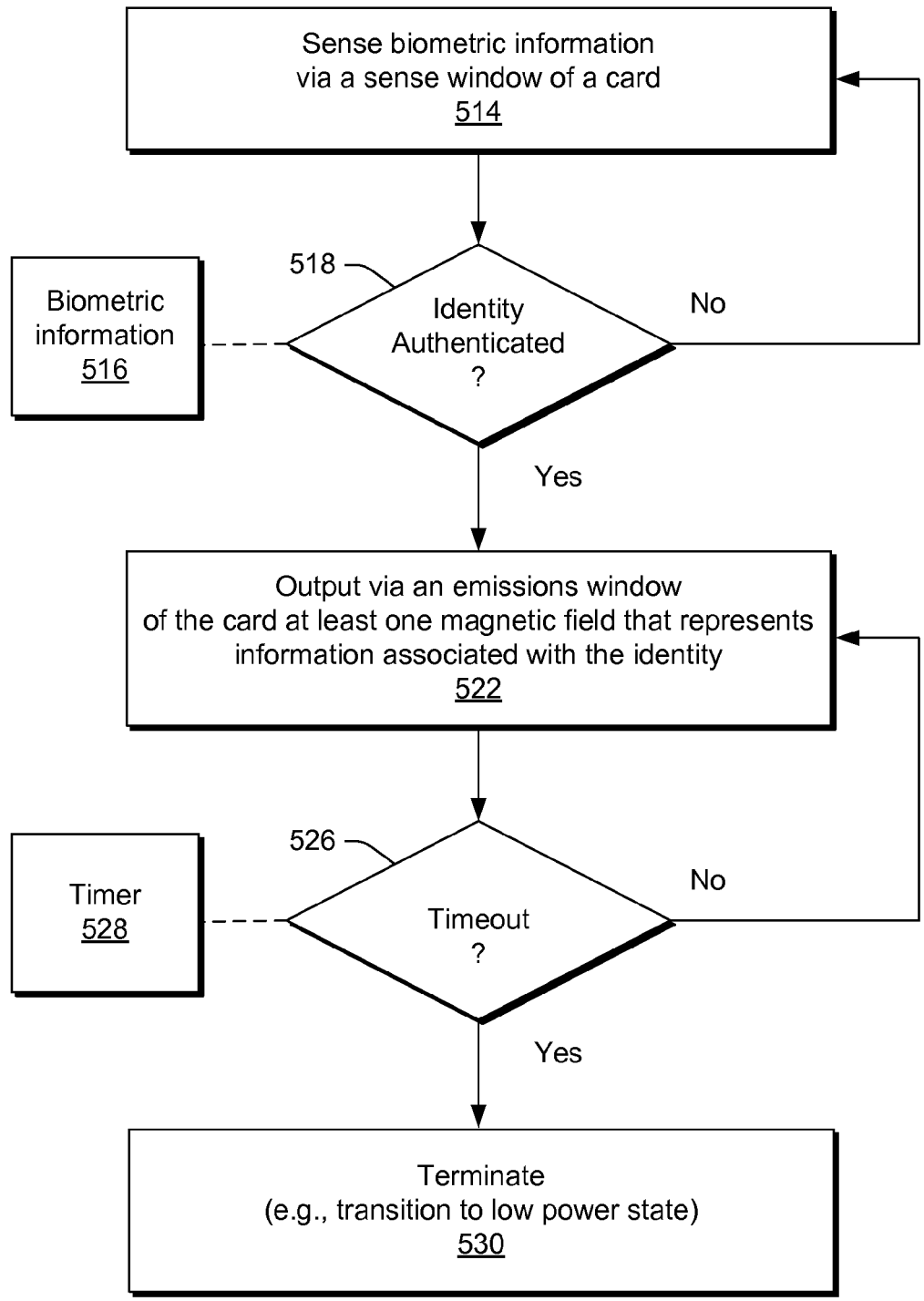
FIG. 5 is a diagram of an example of a method.

FIG. 5 shows an example of a method 510 that includes a sense block 514 for sensing biometric information via a sense window of a card, a decision block 518 for deciding whether the sensed biometric information has been authenticated by the card with respect to an identity (e.g., via accessing stored biometric information 516 associated with the identity), an output block 522 for outputting via an emissions window of the card at least one magnetic field that represents information associated with the identity, a decision block 526 for deciding whether a timeout has occurred (e.g., via information from a timer 528), and a termination block 530 for terminating the output of the at least one magnetic field via the emissions window of the card and, for example, optionally transitioning the card to a low power state.

In the example of FIG. 5, the decision block 518 may return to the sense block 514 where an identity is not authenticated (e.g., "no" branch) and, as shown, proceed to the output block 522 where an identity is authenticated (e.g., "yes" branch). In the example of FIG. 5, the decision block 526 may return to the output block 522 where a timeout has not occurred (e.g., "no" branch) and, as shown, proceed to the termination block 530 where a timeout has occurred (e.g., "yes" branch).

Figure 6:
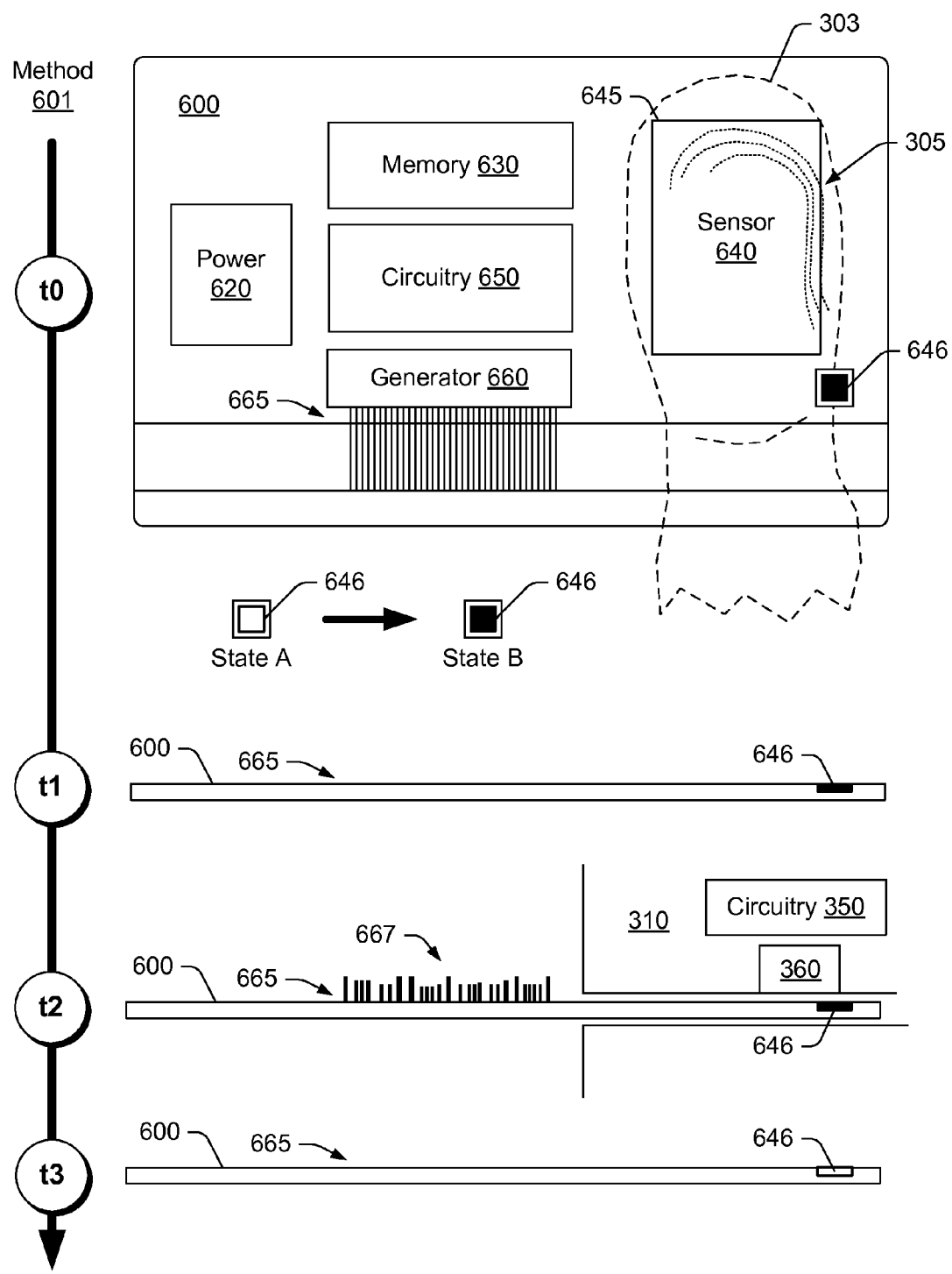
FIG. 6 is a diagram of an example of a card and an example of a method.

FIG. 6 shows an example of a card 600 and an example of a method 601 with respect to a time line where the method 601 may include using the card 600 and, for example, the reader 310 that includes the circuitry 350 operatively coupled to the read head 360 (e.g., or read heads).

In the example of FIG. 6, the card 600 includes a power source 620, memory 630, a sensor 640, a reader sensor 646, circuitry 650 and a generator 660 that may generate a field, for example, with respect to a field window or emissions window 665. As an example, the emissions window 665 may be defined with respect to a coordinate system such as, for example, a Cartesian coordinate system (see, e.g., x and y coordinates in FIG. 6).

In the example of FIG. 6, the card 600 includes the memory 630 that can store information; the sensor 640 that can sense information; the reader sensor 646 that can sense presence of a reader; the circuitry 650 that can authenticate sensed information (e.g., authentication circuitry); and the generator 660 that can output at least one magnetic field, for example, based at least in part on a portion of stored information responsive to authentication of sensed information and, for example, responsive to sensed presence of a reader (e.g., per the reader sensor 646).

As shown in the example of FIG. 6, at a time t0, a finger 303 with a fingerprint 305 is positioned with respect to a sensor window 645 associated with the sensor 640 of the card 600. Responsive to authentication of the fingerprint 305, for example, by comparison to biometric information stored in the memory 630, the circuitry 650 of the card 600 may activate the reader sensor 646. As shown in the example of FIG. 6, the reader sensor 646 may be associated with one or more states where it may transition from one state to another state (e.g., from State A to State B) responsive to authentication of sensed information by the sensor 640. In such an example, the reader sensor 646 may act as a trigger that may be in a set state or a non-set state. In a set state, the reader sensor 646 may be energized, for example, to detect proximity of the card 600 with respect to a reader such as the reader 310. For example, the reader sensor 646 may be a proximity sensor that may emit, detect or emit and detect energy to determine whether it is proximate to a reader (e.g., within a slot of a reader, etc.).

As shown in the example of FIG. 6, at a time t1, the card 600 is in a set state per activation of the reader sensor 646, which may be responsive to authentication of the fingerprint 305 as sensed via the sense window 645. In the set state, the card 600 is shown as not emitting a field via the emissions window 665.

As shown in the example of FIG. 6, at a time t2, the reader sensor 646 is positioned proximate to the reader 310 by, for example, entering a slot of the reader 310. In response, the generator 660 generates at the emissions window 665 at least one magnetic field 667 while the card 600 may be in transit in a slot of the reader 310. At time t3, the at least one magnetic field 667 is no longer present at the emissions window 665 (e.g., no longer present in a manner capable of being read by the read head 360). In the example of FIG. 6, the at least one magnetic field 667 may include magnetic fields spatially arranged to effectively create inflection points. In such an example, the magnitude of fields generated may be relatively even, differ, etc.

As an example, the card 600 may transition from a set state to a non-set state after being positioned proximate to a reader. For example, where the reader sensor 646 detects a reader, the generator 660 may generate at least one magnetic field at the emissions window 665 for a period of time, which may be, for example, based at least in part on a swipe speed (e.g., or a range of swipe speeds). In such an example, after the period of time passes, re-generation of the at least one magnetic field may depend on re-authentication and re-setting of the reader sensor 646 (e.g., or appropriate circuitry associated therewith). As an example, the card 600 may be configured to allow for a predetermined number of passes with respect to a reader (e.g., through a slot of a reader, etc.), for example, based on one or more of a period of time, a number of sensed passes per the reader sensor 646, etc. As an example, a predetermined number of passes may be two or more and, for example, less than about six. A number of passes may be allowed, for example, as a read error may occur for one or more reasons (e.g., alignment of a card with respect to a reader, swipe speed, etc.). As an example, a session may be a single pass or, for example, a string of passes that occur within a period of time (e.g., responsive to authentication and/or sensing proximity to a reader, etc.).

As an example, the card 600 may be configured to emit at least one magnetic field in a temporal manner, for example, as explained with respect to the temporal schemes 204 of FIG. 2. In such an example, where the reader sensor 646 is in an active state (e.g., a set state), detection of proximity to the reader 310 may cause the generator 660 to generate a temporal field that may optionally loop in time (e.g., repeated loops for a period of time). As mentioned, information encoded may include one or more codes that may indicate a start and/or an end of a "string" of information. In such an example, the circuitry 350 of the reader 310 may be able to decode a generated temporal field, which may be, for example, "played" in a loop. As an example, a session may be a single loop play or, for example, a string of loops played within a period of time (e.g., responsive to authentication and/or sensing proximity to a reader, etc.).

Figure 7:
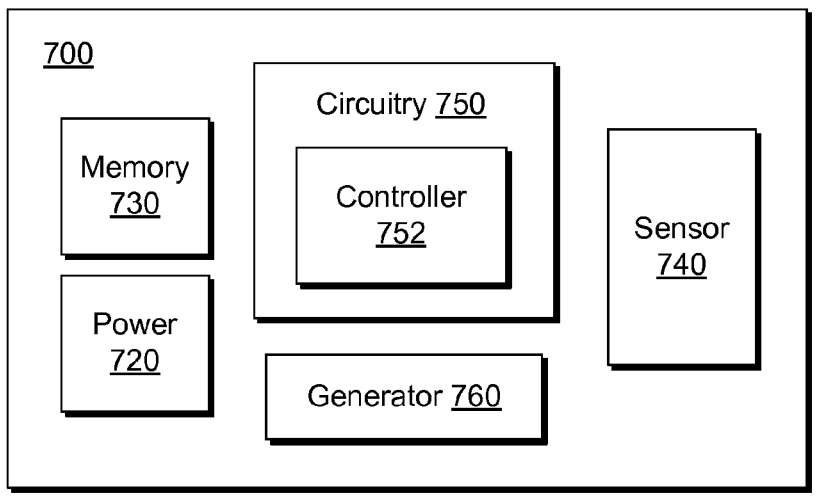
FIG. 7 is a diagram of an example of a card and examples of circuitry.
Figure 7:
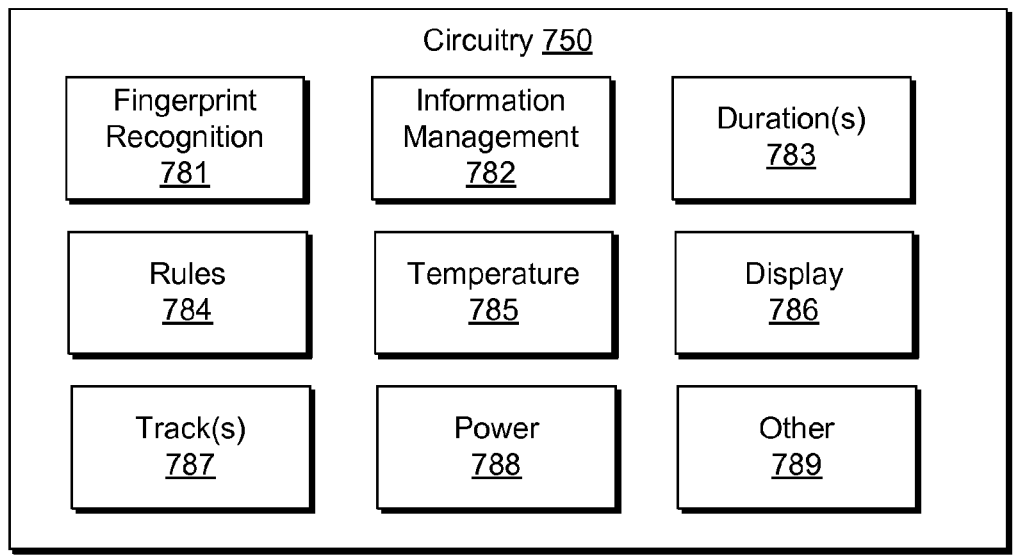
Figure 7:
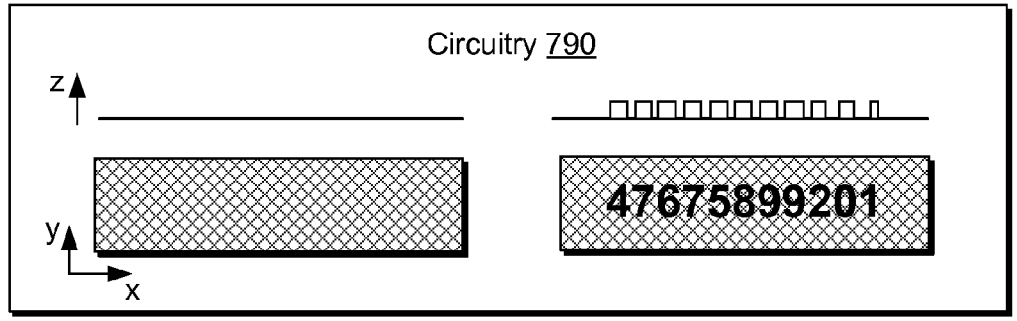

FIG. 7 shows an example of a device 700 that includes a power source 720, memory 730, a sensor 740, circuitry 750 that includes a controller 752, and a generator 760. As an example, the power source 720 may be a battery or batteries. As an example, a battery may be a lithium-ion-based battery or other type of battery. As an example, the controller 752 may be a microcontroller, for example, such as an ARC-based microcontroller, an ARM-based microcontroller, etc. As an example, the controller 752 may be or include a processor.

In the example of FIG. 7, the circuitry 750 may be configured for fingerprint recognition 781, information management 782, duration(s) 783, rules 784, temperature 785, display 786, track(s) 787, power 788 and/or other functionality 789.

As shown in FIG. 7, as an example, a device may include tactile output circuitry 790 that can, for example, control a mechanism that can raise a surface of the card in a manner that may be visually read, tactilely felt, processed via an impression reader, etc. For example, a POS system may be electronic (e.g., ETS) or non-electronic. A non-electronic POS may include multilayer purchase slips to record credit card information, for example, where raised characters on a credit card can make a carbon copy impression of the credit card when a roller slides across a tray of a POS device. As an example, a manual credit card machine may help facilitate a transaction in the event of a power outage or problem with an automated regular credit card machine. As an example, a tactile output may output information for a period of time in an active state before returning to a wait or sleep state.

Figure 8:
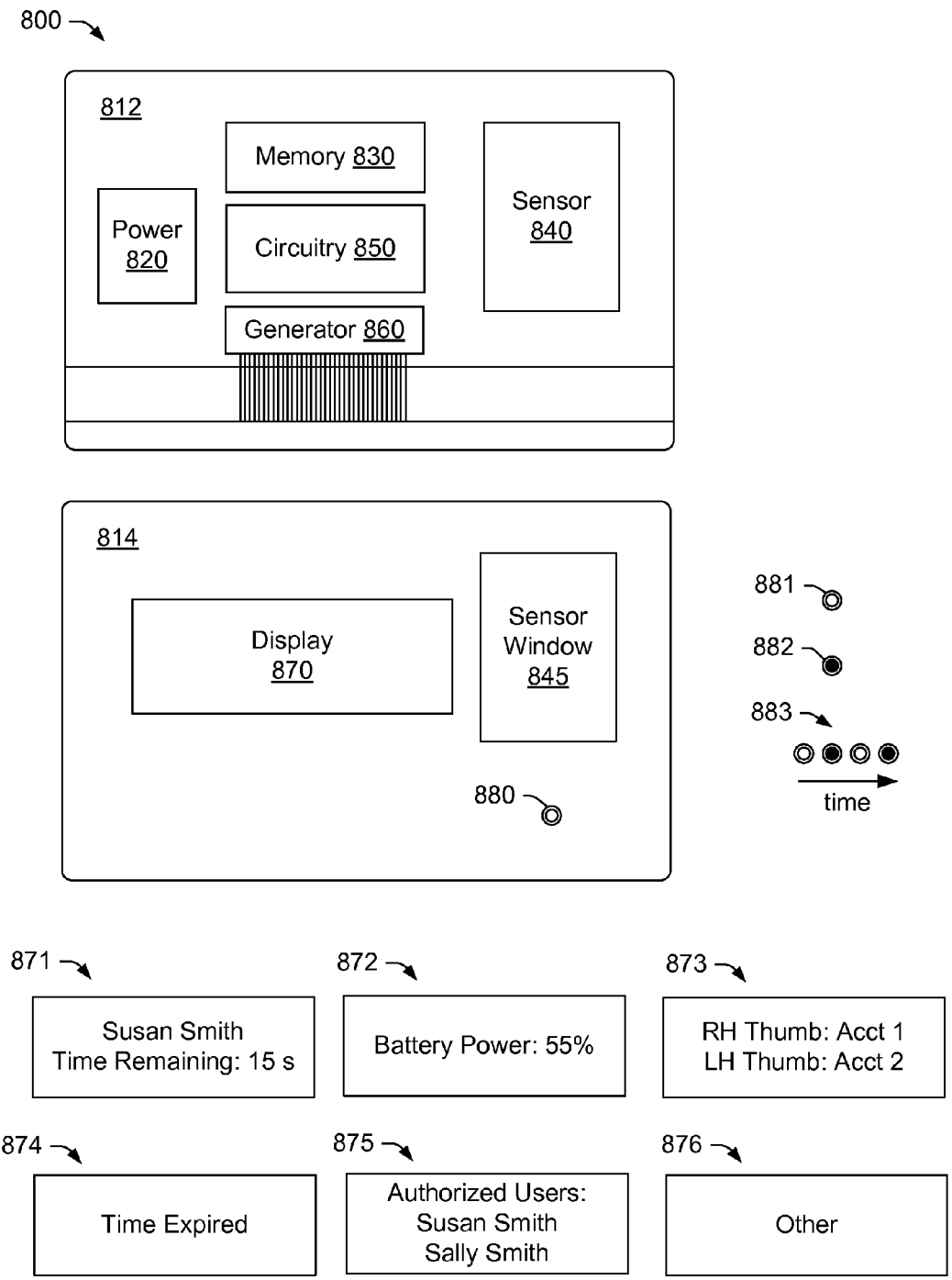
FIG. 8 is a diagram of an example of a card an examples of features.

FIG. 8 shows an example of a card 800 that includes opposing sides 812 and 814 and that includes a power source 820, memory 830, a sensor 840, circuitry 850 and a generator 860. As shown in the example of FIG. 8, the card 800 may include a sensor window 845, a display 870 and/or an indicator 880. As an example, the sensor window 845, the display 870 and/or the indicator 880 may be located on one side of the card 800, both sides of the card 800, etc.

As an example, the card 800 may be configured via the circuitry 850 to render information to the display 870. As an example, the display 870 may display information such as name and time remaining 871, battery power 872, associations between fingers and accounts 873, time expired 874, authorized user(s) 875 and/or other information. For example, the card 800 may store information for one account in association with a right hand thumb and may store information for another account in association with a left hand thumb. In such an example, an authentication algorithm may determine whether sensed biometric information is associated with an identity and an account. In turn, a generator may generate at least one magnetic field for one of a plurality of accounts. As an example, a card may be configured with information for a plurality of accounts where an association exists between individual fingerprints and individual accounts.

As an example, a display of a card may display information such as, for example, a transaction identifier (e.g., "Number for this purchase: 9876 7888 1234 4444"), a name, a credit card or debit card number, an expiration date, a code, etc.

As an example, the indicator 880 may be an emitter such as, for example, a LED. As an example, the indicator 880 may be a LCD-based indicator, for example, that may be clear, opaque, etc. depending on state. As an example, the indicator 880 may have a first state 881 and a second state 882 and may, for example, transition from the state 881 to the state 882 (e.g., and vice versa) with respect to time. As an example, a state or states of the indicator 880 may indicate, for example, authentication, lack of authentication, time remaining, time expired, etc.

Figure 9:
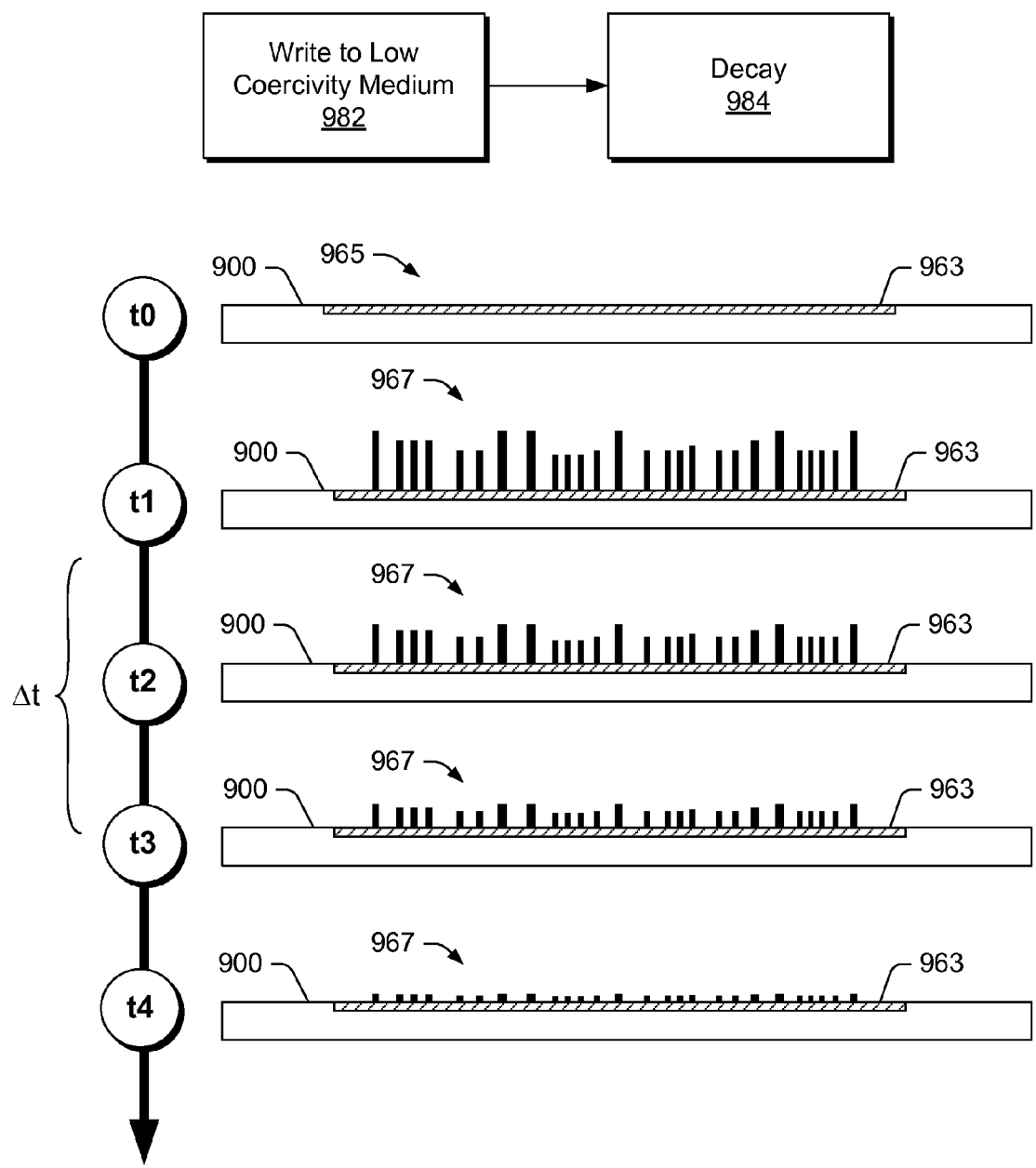
FIG. 9 is a diagram of an example of a method.

As mentioned, a card may optionally include a medium that includes magnetic material. FIG. 9 shows an example of a method 980 that includes a write block 982 for writing information to a low coercivity medium and a decay block 984 where the written information decays with respect to time (e.g., the low coercivity medium loses the signal). As shown with respect to a time line, at a time t0, a card 900 includes a medium 963 and an emissions window 865 that does not emit a magnetic field (e.g., at a level sufficient to allow for reading by a read head of a reader). At a time t1, a generator of the card 900 may generate at least one magnetic field that writes information to the medium 963 such that the medium 963 emits at least one magnetic field 967 that represents the information. At time t2, the medium 963 may emit the at least one magnetic field 967 with less strength, which may continue to decay over time (e.g., from times t3 to t4, etc.). In such an example, the strength of the at least one magnetic field emitted by the medium 963 may be sufficient between the times t1 and t3 for reading by a read head (e.g., or read heads) of a reader (see, e.g., the reader 310 of FIG. 3, etc.).

As an example, a card may include a temperature sensor. As an example, a sensed temperature may determine an amount of energy to be used for generating at least one magnetic field. For example, the medium 963 of the card 900 of FIG. 9 may be dependent on temperature as to one of more characteristics of magnetic material that it includes. As an example, temperature may be related to a decay rate such that a higher temperature causes a more rapid decay in at least one magnetic field of the medium 963. As an example, where at least one magnetic field is to persist for a period of time with respect to a medium, a generator may generate a stronger field where temperature is higher and a lower field where temperature is lower. Such an approach may act to maintain a relatively constant period of time, for example, regardless of temperature.

Figure 10:
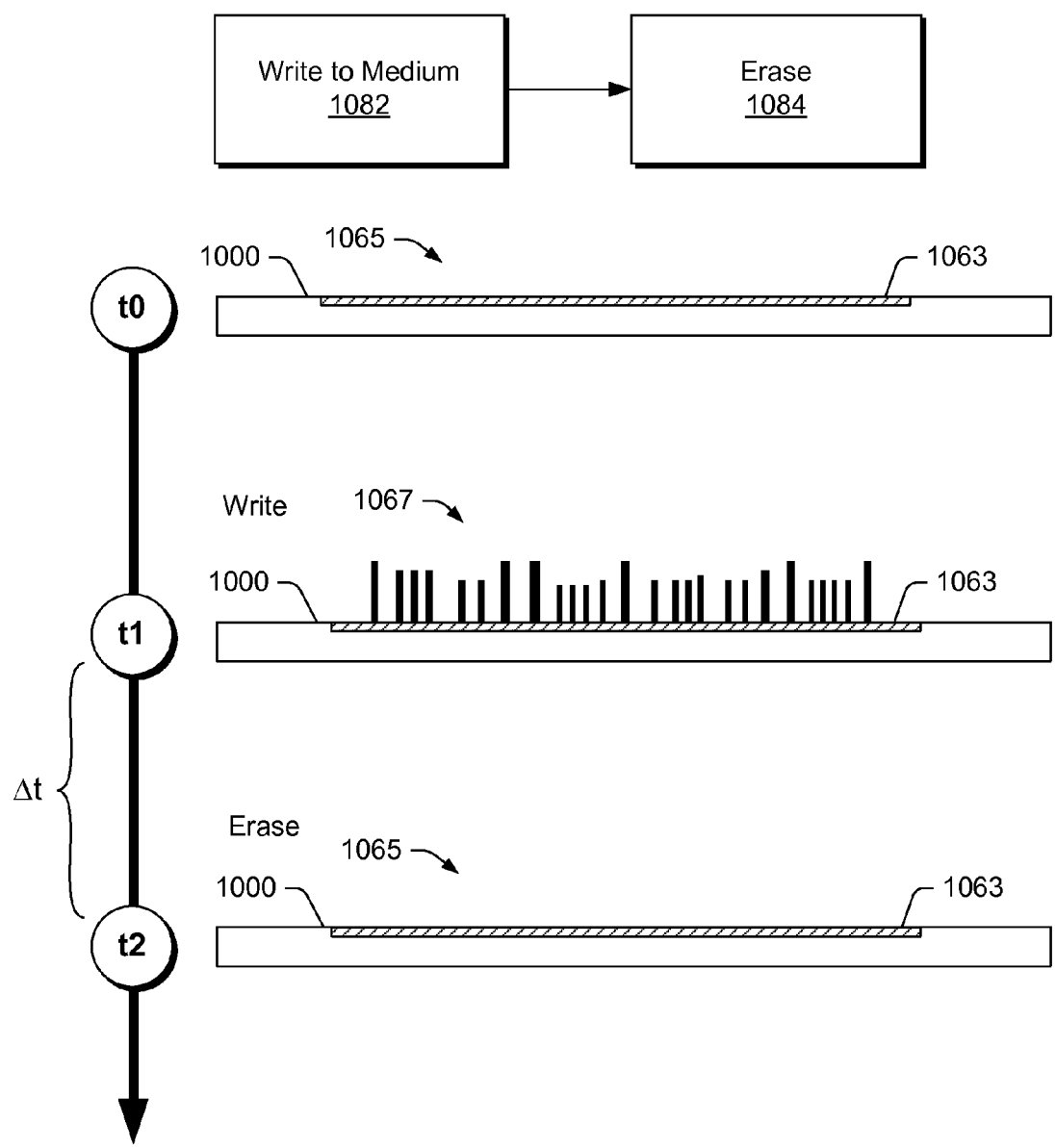
FIG. 10 is a diagram of an example of a method.

FIG. 10 shows an example of a method 1080 that includes a write block 1082 for writing information to a medium and an erase block 1084 for erasing information written to the medium. As shown with respect to a time line, at a time t0, a card 1000 includes a medium 1063 and an emissions window 1065 that does not emit a magnetic field (e.g., at a level sufficient to allow for reading by a read head of a reader). At a time t1, a generator of the card 1000 may generate at least one magnetic field that writes information to the medium 1063 such that the medium 1063 emits at least one magnetic field 1067 that represents the information. At time t2, the generator of the card 1000 may generate at least one magnetic field that erases information from the medium 1063 such that the medium 1063 no longer emits a magnetic field that represents the information previously written. In such an example, a delay between t1 and t2 may be sufficient for reading of the information of the medium 1063 by a read head (e.g., or read heads) of a reader (see, e.g., the reader 310 of FIG. 3, etc.).

Figure 11:
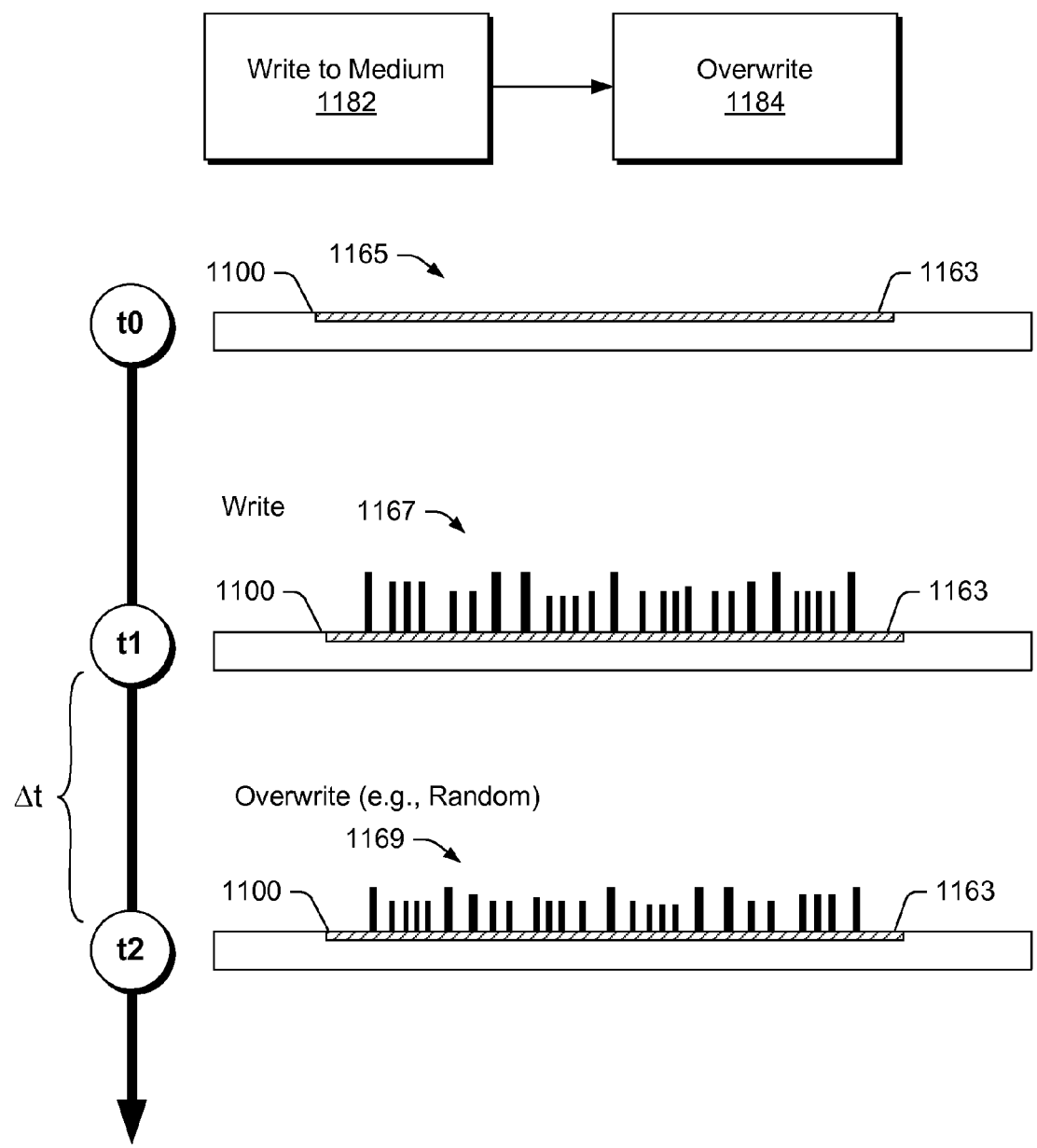
FIG. 11 is a diagram of an example of a method.

FIG. 11 shows an example of a method 1180 that includes a write block 1182 for writing information to a medium and an overwrite block 1184 for overwriting information written to the medium. As shown with respect to a time line, at a time t0, a card 1100 includes a medium 1163 and an emissions window 1165 that may not emit a magnetic field (e.g., at a level sufficient to allow for reading by a read head of a reader). At a time t1, a generator of the card 1100 may generate at least one magnetic field that writes information to the medium 1163 such that the medium 1163 emits at least one magnetic field that represents the information. At time t2, the generator of the card 1100 may generate at least one magnetic field that overwrites information of the medium 1163 such that the medium 1163 no longer emits a magnetic field that represents the information previously written. As shown, the medium 1163 may emit one or more magnetic fields 1169 that represent random or other information. In such an example, a delay between t1 and t2 may be sufficient for reading of the information of the medium 1163 by a read head (e.g., or read heads) of a reader (see, e.g., the reader 310 of FIG. 3, etc.). As an example, an overwrite process may include an erase process.

In the examples of FIG. 9, FIG. 10 and FIG. 11, a power source may conserve power through use of a medium that includes a magnetic material. For example, a card may include a power source that may activate a generator powered by the power source for a limited period of time, for example, a period of time sufficient to write information to a medium that includes a magnetic material and, for example, to optionally erase information written to a medium that includes a magnetic material and/or to overwrite information written to a medium that includes a magnetic material.

Figure 12:
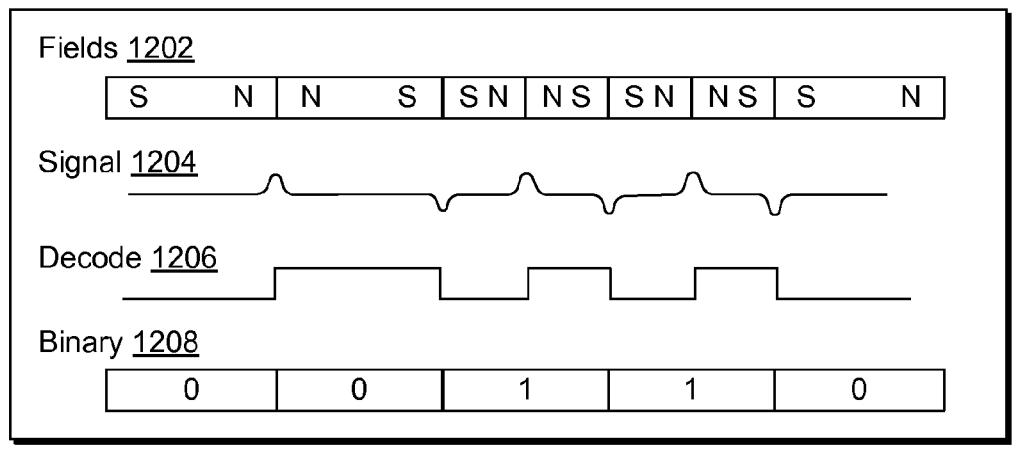
FIG. 12 is a diagram of an example of a system.
Figure 12:
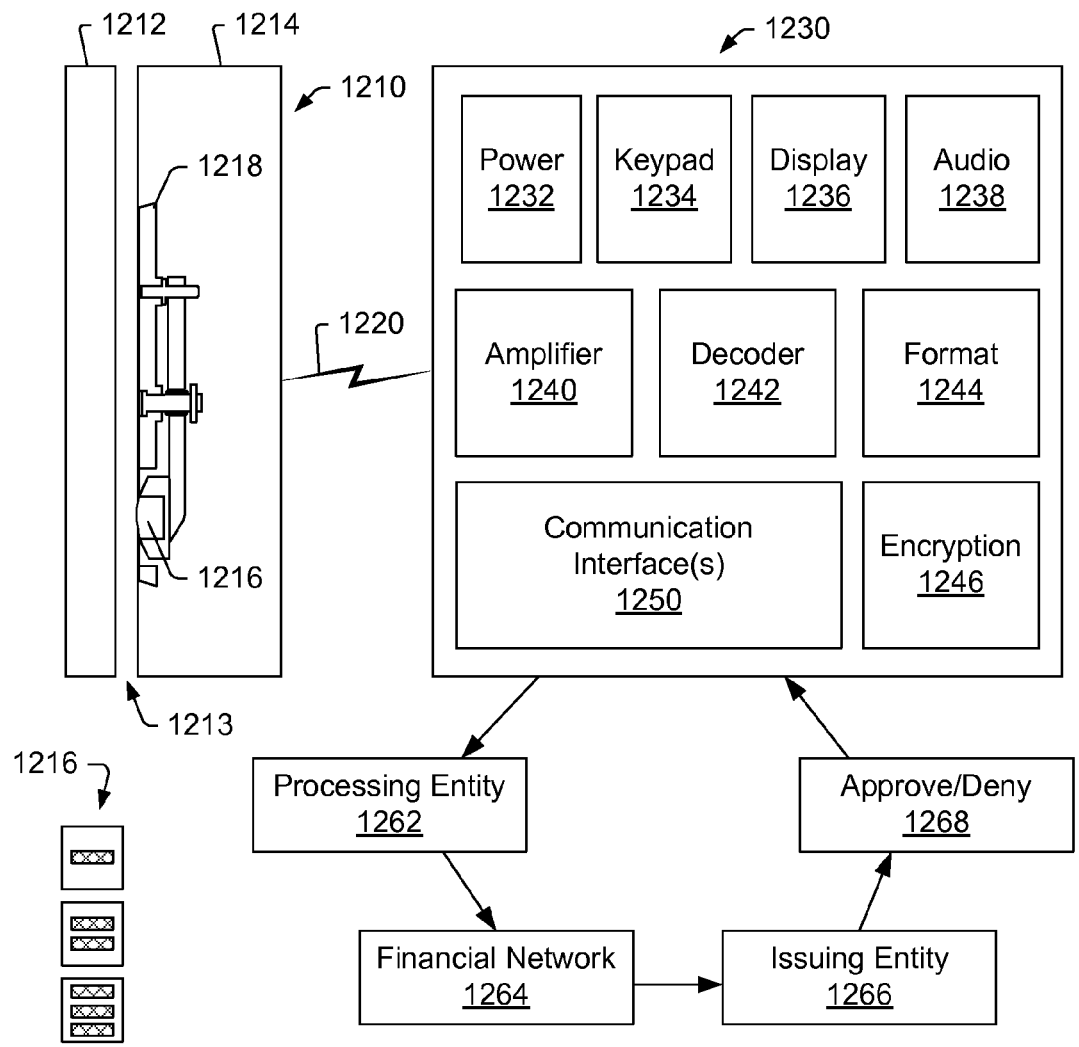

FIG. 12 shows an example of a system 1200 that includes a reader 1210 operatively coupled to circuitry 1230, for example, via a link 1220 (e.g., a wired link, a wireless link, etc.). As an example, the reader 1210 may read one or more magnetic fields 1202 and generate a signal 1204 that the circuitry 1230 may receive and decode to provide decoded information 1206 that may be further processed by the circuitry 1230 to provide formatted information 1208, for example, in a binary format. In such an example, the signal 1204 may be encoded per an encoding scheme such as, for example, the F2F (Aiken Biphase) encoding scheme (e.g., per ISO/IEC-7811) where, in the approximate illustration of FIG. 12, a "0" may be represented as a single magnet two units in length and a "1" may be represented as two magnets that are each one unit in length (see, e.g., the flux transitions in the signal 1204).

In the example of FIG. 12, the reader 1210 includes two portions 1212 and 1214 that define a slot 1213. As shown, a read head 1216 is positioned facing the slot 1213 via a mechanism 1218, which may, for example, include an arm and a spring that carry and bias the read head 1216. As an example, the read head 1216 may include one or more track circuits, for example, to read one or more tracks of information (e.g., tracks of magnetic fields). As shown, the reader 1210 and the circuitry 1230 are linked via the link 1220 such that signals read by the read head 1216 may be transmitted to the circuitry 1230 (e.g., via a wired link, a wireless link, etc.).

As an example, an emissions window of a device (e.g., such as a card (see, e.g., the card 200 of FIG. 2), etc.) may be positioned on the device such that it can emit signals to be read by a read head such as the read head 1216. As an example, an emissions window may emit signals outwardly in one direction or, for example, outwardly in two directions (e.g., to optionally allow for multiple orientations of a device with respect to a read head). As mentioned, as an example, a device may include an emissions window that emits signals where such signals may be read by a read head when the device is stationary with respect to the read head. For example, a device may be positioned in the slot 1213 for a period of time (e.g., without translating the device) during which signals are emitted by the device (e.g., via an emissions window) such that a read head may read the emitted signals.

As shown in the example of FIG. 12, the circuitry 1230 may include a power supply or connector 1232, keypad circuitry 1234, display circuitry 1236, audio circuitry 1238, amplification circuitry 1240, decoder circuitry 1242, format circuitry 1244, encryption circuitry 1246 and one or more communication interfaces 1250.

As an example, signals read by the read head 1216 may be transmitted to the amplification circuitry 1240 via the link 1220. The amplification circuitry 1240 may optionally include automatic gain control (AGC) circuitry that may adjust amplitude of received signals (e.g., input waveforms), for example, to enhance dynamic range. As an example, the decoder circuitry 1242 may include analog-to-digital conversion (ADC) circuitry that can convert received signals, for example, as adjusted by the amplification circuitry 1240. As an example, the amplification circuitry 1240 may include ADC circuitry, for example, to monitor input signal levels and adjust programmable gain amplification (PGA) circuitry. As an example, the amplification circuitry 1240 may include a peak and hold circuit (e.g., to hold one or more peak amplitudes). As an example, ADC circuitry may be implemented for peak detection and may operate in a range, for example, from about 100 ksps to about 1 Msps.

As an example, the format circuitry 1244 may format output from the decoder circuitry 1242, which may be then encrypted via the encryption circuitry 1246, for example, to encrypt formatted information prior to transmission via at least one of the one or more communication interfaces 1250. As an example, the encryption circuitry 1246 may provide for error checking. For example, the encryption circuitry 1246 may be configured according to an algorithm that performs, at least in part, a checksum. As an example, consider the Luhn algorithm (e.g., modulus 10 algorithm) that may include a checksum formula that may be implemented to validate information such as, for example, an identification number (e.g., a credit card number, etc.).

As an example, the circuitry 1230 may include one or more operational amplifiers (e.g., for a signal gain stage), one or more PGAs (e.g., for one or more AGCs), one or more ADCs (e.g., single or multichannel, about 12-bit depth, etc.), one or more digital-to-analog converters (DACs), one or more comparators, one or more sample and hold circuits, and optionally a microcontroller (e.g., an ARM-based microcontroller, an ARC-based microcontroller, etc.). As an example, the circuitry 1230 may include a processor, which may be or include a microcontroller.

As an example, the system 1200 may be implemented as a POS system. For example, the circuitry 1230 may transmit information to a processing entity 1262 that may direct information to an appropriate financial network 1264 for transmission to, for example, an issuing entity 1266. In such an example, the issuing entity 1266 may make a determination as to whether a financial transaction associated with the information transmitted by the circuitry 1230 is approved or denied. As shown in the example of FIG. 12, an approval or a denial 1268 may be transmitted for receipt by the circuitry 1230 via at least one of the one or more communication interfaces 1250. Such a loop may be considered to include an authorization request (e.g., for a particular amount of currency) and an authorization response (e.g., approved or denied).

As an example, a method may include simulating a magnetic swipe card capability with a microcontroller managed emitter and a fingerprint reader, for example, as packaged according to a standard credit card format. In such an example, a stripe region on a card may be a thin film magnetic film configured to emit at least one magnetic field (e.g., via generator circuitry). As an example, the film may run a length of a card or a portion thereof. As an example, when activated, the film may act to transmit magnetic signals at a data rate, for example, akin to swiping the card at normal speed through a reader.

As an example, a detector (e.g., optical, magnetic, electric, capacitive, etc.) may determine a card is being swiped and, for example, initiate information transmission. As an example, a card may include a fingerprint reader, for example, optionally coupled to a microcontroller. As an example, a fingerprint reader may include a detector that acts to power on a microcontroller, for example, such that battery power is used when the fingerprint reader is covered by a finger (e.g., finger or thumb or combination thereof).

As an example, a microcontroller may prohibit transmission of card data unless an authorized fingerprint had been detected (e.g., authenticated). As an example, a card may not have account information externally thereon.

As an example, a security mechanism may allow for transmission of card data when a valid fingerprint is detected. As an example, a card may be configured to transmit card data for a short period (e.g., about 20 seconds) after a fingerprint has been validated (e.g., authenticated).

As an example, a user (e.g., card owner, authorized card holder, etc.) may get ready to make a transaction, remove a card from his wallet and put his finger on a sensor window of the card. The user may then hand the card to a clerk who then swipes the card through a slot of a reader. In such an example, the card may determine that a swipe is in process and transmit card data (e.g., information stored in memory of the card) for reading by a read head of the reader (e.g., which may be a POS device). As an example, a timeout may occur (e.g., via a timer circuit) such that the card becomes locked and cannot be used until a valid fingerprint is read again.

As an example, a device can include memory that stores information; a sensor that senses information; authentication circuitry that authenticates sensed information; and a field generator that outputs at least one magnetic field based at least in part on a portion of stored information responsive to authentication of sensed information. As an example, a field generator may generate an electromagnetic field. As an example, a device may have a form factor such as, for example, a card form factor (e.g., a card form factor of a credit and/or debit card, an identity card, etc.). As an example, a device may be a card (e.g., formed as a card, have a card form factor, etc.).

As an example, a device may include a magnetic field generator that outputs at least one magnetic field based at least in part on a portion of information stored in memory of the device responsive to authentication of the information sensed by a sensor of the card. As an example, a device may include authentication circuitry that authenticates information sensed by a sensor of the device.

As an example, a device may include authentication circuitry that includes a processor.

As an example, a device may include a field generator that outputs tracks of magnetic fields. In such an example, tracks may include a first track for output of at least one magnetic field according to a first format and a second track for output of at least one magnetic field according to a second format. As an example, a device may include a field generator that can simultaneously output at least two magnetic fields.

As an example, a device may include a battery. As an example, circuitry may draw power from the battery in response to an activation signal, which may operate in a low power or no power state. For example, an activation circuit may include a capacitor that may release energy stored therein in response to presence of a finger, fingers, etc.

As an example, a device may include a sensor that is a fingerprint sensor. As an example, a device may include an emissions window and a field generator that can output at least one magnetic field to the emissions window. As an example, an emissions window may be defined at least in part by a length and a height (e.g., where the length may exceed the height). As an example, a device may include a sensor and a sense window where the sensor senses information via the sense window.

As an example, a device may include an oxide material that responds to at least one magnetic field to maintain the at least one magnetic field for a period of time. As an example, an oxide material may be a metal oxide and may be a magnetic material. As an example, a device may include a medium that includes magnetic material that may be characterized, for example, by its coercivity. As an example, a medium may include binder, for example, to bind the magnetic material in the medium and, for example, to bond the medium to a substrate, which may be a part of a card.

As an example, a device may include field generator that can output at least one magnetic field to erase at least one magnetic field from a medium that includes magnetic material (e.g., an oxide material, etc.). As an example, a device may include a field generator that can output at least one magnetic field to overwrite at least one magnetic field of a medium that includes magnetic material (e.g., an oxide material, etc.).

As an example, a device may include a field generator that can output at least one magnetic field for a predetermined period of time. For example, consider a field generator that operates based in part on a time period parameter. As an example, a device may include a time period parameter that may take one or more values. As an example, a value may be determined based in part on, for example, duration of a finger with respect to a sensor (e.g., a sensor window), an account, a finger used to authenticate an identity, etc. As an example, a device may include authentication circuitry that can compare sensed information to a portion of stored information.

As an example, a card can include memory that stores account information and biometric information; a sensor that senses biometric information; authentication circuitry that authenticates sensed biometric information at least in part via a comparison to stored biometric information; and a field generator that outputs at least one magnetic field based at least in part on a portion of the stored account information responsive to authentication of sensed biometric information.

As an example, a card may include a magnetic field generator that can output at least one magnetic field based at least in part on a portion of account information stored in memory of the card responsive to authentication of biometric information sensed by a sensor of the card. As an example, a card may include authentication circuitry that can authenticate biometric information sensed by a biometric sensor of the card at least in part via a comparison to biometric information stored by memory of the card.

As an example, account information may include bank account information. As an example, biometric information may include fingerprint information. As an example, a card may include bank account information and fingerprint information.

As an example, a method may include sensing biometric information via a sense window of a card; authenticating the biometric information with respect to an identity; and responsive to the authenticating, outputting via an emissions window of the card at least one magnetic field that represents information associated with the identity. In such a method, the information associated with the identity may include account information. As an example, a method may include passing a card through a magnetic stripe reader.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 13:
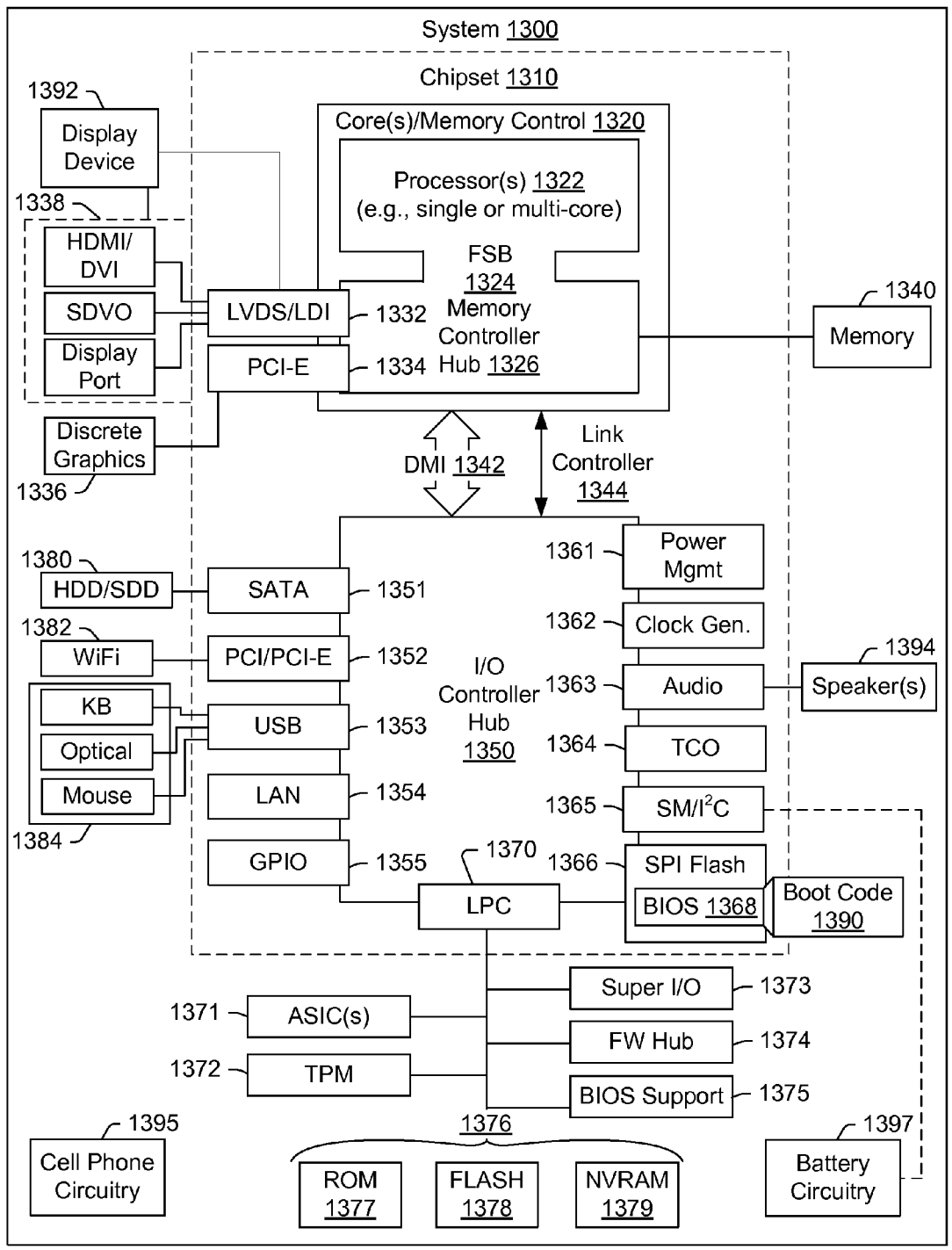
FIG. 13 is a diagram of an example of a system that includes one or more processors.

While various examples of circuits or circuitry have been discussed, FIG. 13 depicts a block diagram of an illustrative computer system 1300. The system 1300 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1300. As described herein, a device such as a reader device, another device, etc. may include at least some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I$^2$C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an I²C interface (see, e.g., the SM/I²C interface 1365), etc.

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   memory that stores information that comprises biometric information;
   a sensor that senses information that comprises biometric information;
   authentication circuitry that authenticates sensed biometric information; and
   a field generator that, based at least in part on a portion of stored information responsive to authentication of sensed biometric information, outputs at least one magnetic field that varies with respect to time to form inflection points that represent bits at a bit rate in bits per second, wherein the bits for at least one magnetic field comprise bank account information and wherein the bit rate for at least one magnetic field is at least approximately 600 bits per second, and wherein the field generator outputs a first track for output of at least one magnetic field according to a first format and outputs a second track for output of at least one magnetic field according to a second format.

2. The device of claim 1 wherein the authentication circuitry comprises a processor.

3. The device of claim 1 comprising a card form factor.

4. The device of claim 1 wherein the field generator simultaneously outputs at least two magnetic fields.

5. The device of claim 1 comprising a battery.

6. The device of claim 1 wherein the sensor comprises a fingerprint sensor.

7. The device of claim 1 wherein the device comprises an emissions window and wherein the field generator outputs the at least one magnetic field to the emissions window.

8. The device of claim 1 wherein the device comprises a sense window and wherein the sensor senses information via the sense window.

9. The device of claim 1 wherein the field generator outputs the at least one magnetic field as a repeated loop of bits for a predetermined period of time.

10. The device of claim 1 wherein the authentication circuitry compares sensed information to a portion of stored information.

11. The device of claim 1 wherein the bit rate mimics a bit rate achieved via swiping the device with respect to a magnetic field reader.

12. A card comprising:
    memory that stores account information and biometric information;
    a sensor that senses biometric information;
    authentication circuitry that authenticates sensed biometric information at least in part via a comparison to stored biometric information; and
    a field generator that, based at least in part on a portion of the stored account information responsive to authentication of sensed biometric information, outputs at least one magnetic field that varies with respect to time to form inflection points that represent bits at a bit rate in bits per second, wherein the bits for at least one magnetic field comprise bank account information and wherein the bit rate for at least one magnetic field is at least approximately 600 bits per second, and wherein the field generator outputs a first track for output of at least one magnetic field according to a first format and outputs a second track for output of at least one magnetic field according to a second format.

13. The card of claim 12 wherein the biometric information comprises fingerprint information.

14. A method comprising:
    sensing biometric information via a sense window of a card;
    authenticating the biometric information with respect to an identity via authentication circuitry of the card; and
    responsive to the authenticating, outputting via an emissions window of the card at least one magnetic field that varies with respect to time to form inflection points that represent bits at a bit rate in bits per second wherein the bits are associated with the identity, wherein the bits for at least one magnetic field comprise bank account information and wherein the bit rate for at least one magnetic field is at least approximately 600 bits per second, and wherein the emissions window outputs a first track for output of at least one magnetic field according to a first format and outputs a second track for output of at least one magnetic field according to a second format.

15. The method of claim 14 comprising maintaining the card stationary with respect to a magnetic stripe reader.

* * * * *